US008734270B2

United States Patent
Harrington (10) Patent No.: US 8,734,270 B2
(45) Date of Patent: May 27, 2014

(54) GOLF CLUB APPARATUS AND METHOD (76) Inventor: James Patrick Harrington, St. Louis Park, MN (US)

(*) Notice: Subject to any disclaimer, the term of this patent is extended or adjusted under 35 U.S.C. 154(b) by 320 days.

(21) Appl. No.: 13/238,906

(22) Filed: Sep. 21, 2011

(65) Prior Publication Data

US 2012/0108356 A1    May 3, 2012

Related U.S. Application Data (60) Provisional application No. 61/385,030, filed on Sep. 21, 2010.

(51) Int. Cl.
*A63B 53/04* (2006.01)

(52) U.S. Cl.
USPC .......................................................... 473/328

(58) Field of Classification Search
USPC .......................................................... 473/328
See application file for complete search history.

(56) References Cited

U.S. PATENT DOCUMENTS

| | | | |
|---|---|---|---|
| 1,505,296 A | 8/1924 | Smith | |
| D212,293 S | 9/1968 | Brown, Jr. | |
| 3,830,503 A | 8/1974 | Consoli | |
| 3,997,170 A | 12/1976 | Goldberg | |
| 5,603,668 A * | 2/1997 | Antonious | 473/328 |
| 5,762,566 A | 6/1998 | King et al. | |
| 6,077,171 A | 6/2000 | Yoneyama | |
| 6,517,449 B2 | 2/2003 | Otoguro | |
| 6,695,714 B1 | 2/2004 | Bliss et al. | |
| 6,846,246 B2 | 1/2005 | Asplund et al. | |
| 7,121,966 B2 | 10/2006 | Fitzmaurice | |
| 8,328,658 B2 * | 12/2012 | Bennett et al. | 473/328 |
| 2002/0061788 A1 | 5/2002 | Marcase | |
| 2003/0060304 A1 | 3/2003 | Fitzmaurice | |
| 2003/0134687 A1 | 7/2003 | Truesdale | |
| 2004/0152537 A1 | 8/2004 | Moore, Jr. | |
| 2005/0064953 A1 | 3/2005 | Moore, Jr. | |

* cited by examiner

*Primary Examiner* — Benjamin Layno (57) ABSTRACT

A golf club apparatus includes a shaft, a grip and a head. The head is attached to the shaft. The head further includes a main body having a ball contacting surface or club face; a heel portion, a toe portion and a sole portion. The shaft attached to the main body proximate the heel portion and the toe portion is distal from an attachment point of the shaft. The sole portion corresponds to the bottom of the main body and is positioned between the toe portion and the heel portion and the leading edge to the trailing edge. A leading edge is an edge formed at the intersection of the club face and the sole portion. The sole portion has a plurality of substantially triangularly shaped or v-shaped grooves therein with axes. Each of the axes is between 0 degrees and 180 degrees to the plane of the club face. This angle is also combined with varying levels of bounce, camber, radius and sole width creating various options within a certain degree of a wedge or iron.

11 Claims, 8 Drawing Sheets

GOLF CLUB APPARATUS AND METHOD

TECHNICAL FIELD

Various embodiments described herein relate to a golf club apparatus and method for designing same for use by different golfers.

BACKGROUND

Some say golf is a simple game. Others contend that it is very difficult. Needless to say, golfers always seem to seek equipment that improves their performance. Many golfers are always seeking ways to gain an edge in their game. The golfing industry, as a result, seems to constantly seek new technologies that deliver improved performance. Of course, there are limits on the technology that can be used in tournament play. Governing bodies promulgate rulings that place limits on the technology thereby keeping the game fair. In this way, the improvements are limited to keep the playing field more or less fair in tournament play. The golf industry still seeks technologies that operate within the rules and outside of the rules of the game so that the equipment produced will appeal to a wide range of players.

SUMMARY

Disclosed is a golf club that includes a series of specifically shaped grooves, furrows or rudders which are formed into the sole of the club. The grooves, furrows or rudders do not extend into the face of the club. The grooves, furrows or rudders have a set of axes which are substantially parallel and nonparallel to one another. The face of the club defines a plane and the various axes traverse the plane in which the face of the club is positioned. The angle of the axes with respect to the face of the club can be changed to accommodate how different golfers swing the golf club through their golf swing. Other aspects of the club can also be changed to further tailor the club to the play of the golfer. This includes varying the: shaft length, shaft weight, loft angle, lie angle, grip size, head weight, bounce angle, camber, radius, sole width and leading edge sharpness, and center of gravity of the club head.

BRIEF DESCRIPTION OF THE DRAWINGS

The embodiments will be readily understood by the following detailed description in conjunction with the accompanying drawings, wherein like reference numerals designate like structural elements, and in which.

DETAILED DESCRIPTION

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Figure 1:
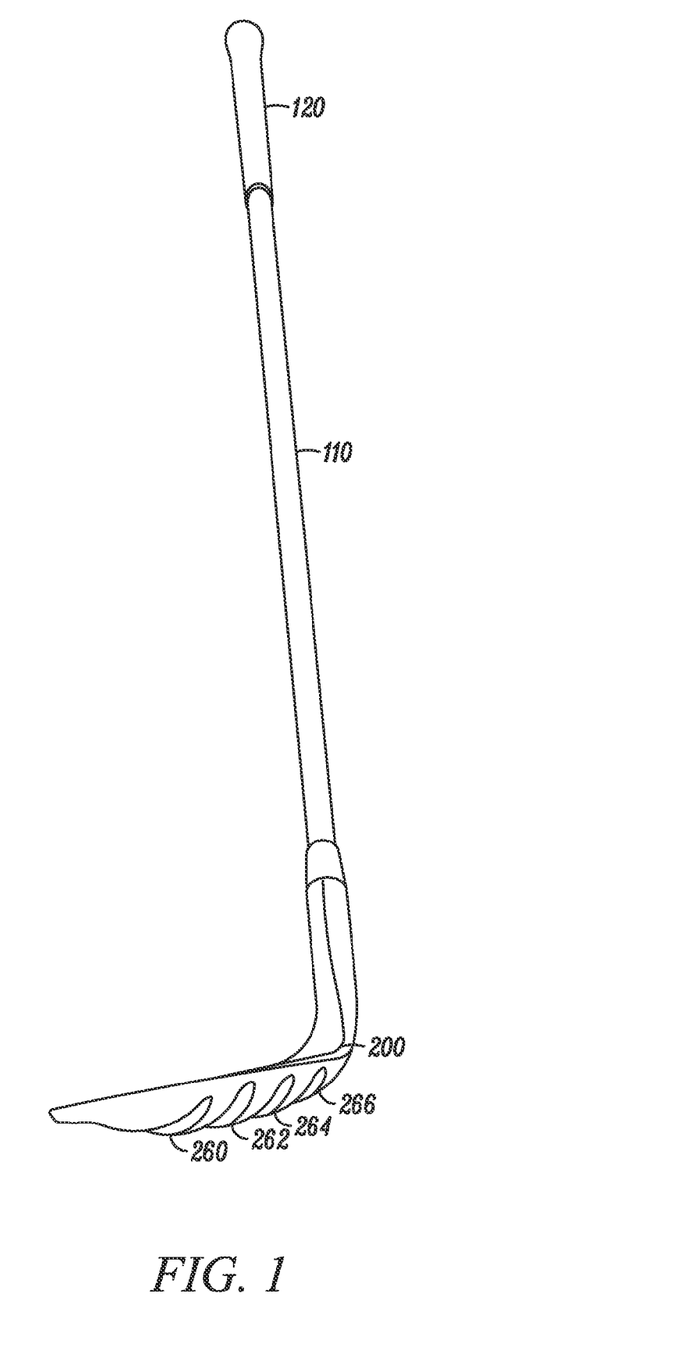
FIG. 1 is a perspective view of a golf club, according to an example embodiment.

FIG. 1 is a perspective view of a golf club 100, according to an example embodiment. The golf club 100 includes a shaft 110. A grip 120 is attached to one end of the shaft 110. The grip 120 enables the user of the golf club 100 to comfortably and reliably hold the golf club 100 during use. The grip 120 is firmly attached or fixed to the one end of the shaft 110. A head or club head 200 is attached or fixed to the other end of the shaft 110. The club head 200 includes the portion which contacts a golf ball. The club head 200 is also firmly attached or fixed to the end of the shaft 110 so that it will stay firmly in place or fixed during use, namely the swing, of the golf club 100. As can be seen in FIG. 1, the bottom of the club head includes a plurality of grooves, furrows or channels. Some of the plurality of grooves, furrows, or channels 260, 262 are shown in FIG. 1. The plurality of grooves, furrows or channels will be further detailed in the following paragraphs.

Figure 2:
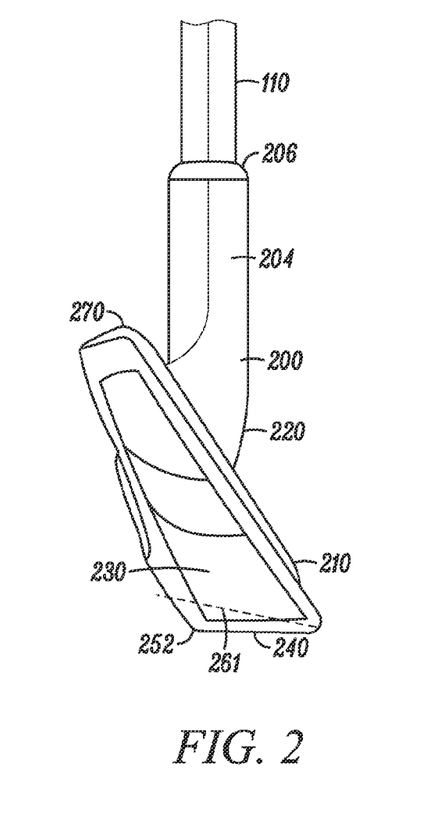
FIG. 2 is a side view of the head of a golf club, according to an example embodiment.
Figure 3:
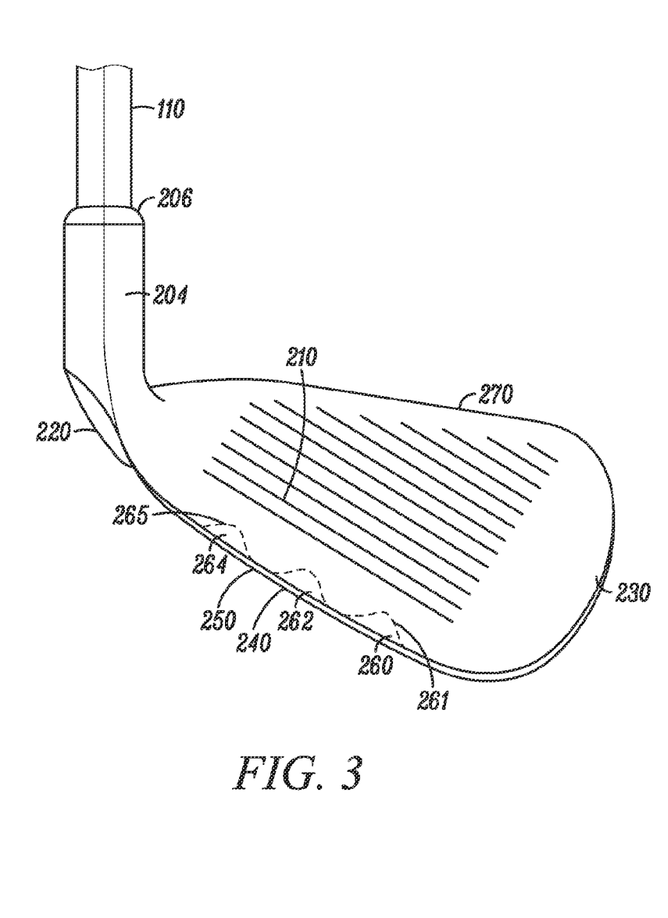
FIG. 3 is a perspective view of the head of a golf club, according to an example embodiment.

FIG. 2 is a side view of the head of a golf club, according to an example embodiment. FIG. 3 is a perspective view of the head 200 of a golf club 100, according to an example embodiment. Now referring to both FIGS. 2 and 3, the example embodiment will be further discussed. The club head 200 includes a main body 202. The body 202 includes a hosel socket 204 and a hosel 206 which are positioned near one end of the main body 202. The main body 202 further includes a ball contacting surface or club face 210, a heel portion 220, a toe portion 230, a sole portion 240, and a top line 270. The sole portion 240 is the bottom surface of the club head and is defined from a leading edge to a trailing edge 252 and from the toe section to the heel section 200. The leading edge 250 is an edge defined by the intersection of the sole 240 and the ball striking surface or club face 210. The hosel socket 204 and the hosel 206 are located on one end of the main body 202. More specifically, the hosel socket 204 and the hosel 206 are positioned near the heel portion 220 of the club head 200. The shaft 110 is attached to the main body by way of the hosel socket 204 and the hosel 206.

Figure 6:
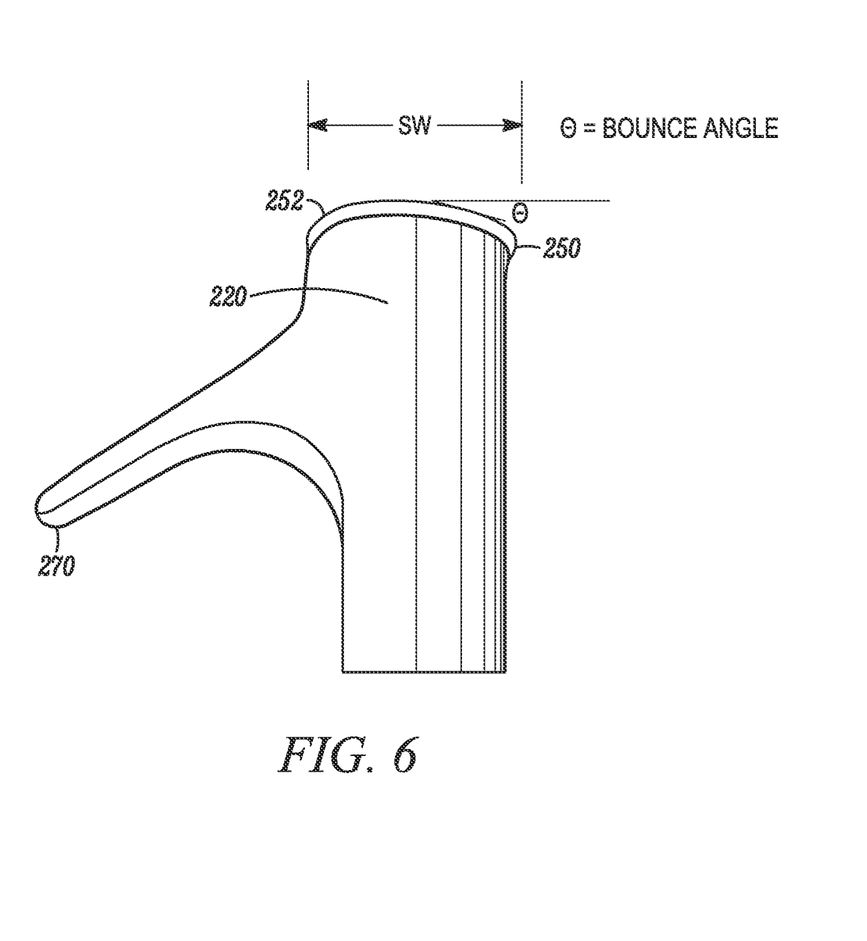
FIG. 6 is a side view of a head of a golf club from the heel portion 220, according to an example embodiment.

The sole portion 240 forms the bottom of the main body 202 and is positioned between the toe portion 230 and the heel portion 220 and between the leading edge and trailing edge of the club. There are some distinct features that are associated with the design of the sole. These features include bounce angle, sole width, sole camber, effective bounce, and leading edge radius. All of these elements affect the way your wedge or iron interacts with the ground based upon a golfer's swing. FIG. 6 is a side view of a head of a golf club from the heel portion 220, according to an example embodiment. A bounce angle ("Bounce"), theta, is the angle created from the leading edge 250 to the trailing edge 252 of the golf club. Bounce resists the wedge or iron from digging into the ground at impact. The less Bounce a wedge or iron has, the more knife-like the club is and the more apt it will be to dig into the ground versus a wedge or iron with a higher bounce angle, theta. As the bounce angle, theta, increases, the wedge or iron will resist digging at impact. It is more beneficial for players with a steep angle of attack to use a wedge or iron with higher Bounce. High Bounce will resist the digging created with a steep angle of attack. The same is true for players with a shallow angle of attack; a lower Bounce wedge or iron will help to effectively dig into the ground creating efficient ball contact.

Sole width, denoted sw in FIG. 6, is another element of design that has an effect on turf interaction and works together with the bounce angle. The greater the sole width, sw, of a wedge or iron, the more surface area it has and the more it will resist digging into the ground. As the sole of the wedge or iron is narrowed, the surface area is reduced allowing the wedge or iron to dig easier into the ground than a wider sole. Thus, sole width, sw, is also a function of bounce and affects how easily your wedge or iron will dig into the ground. For example, if you have two wedges or irons, each with a measured bounce angle, theta, of 10 degrees but different sole widths, sw, the wedge or iron with the wider sole has more surface area to resist digging and will play with more bounce than the wedge or iron with the narrower sole.

Camber is the amount of curvature or arch on the sole of the wedge or iron. Camber can be measured from the heel to toe as well as from the leading edge to trailing edge of the wedge or iron. Camber, when looked at from the heel to the toe, creates the ability to open the wedge or iron up for delicate shots around the green. Heel-toe camber also helps in preventing the heel and toe from catching when hitting the ball below and above your feet on uneven lies. Camber from leading edge to trailing edge ultimately adds bounce to a wedge or iron while reducing the sole width, sw.

Effective Bounce is the combination of bounce angle, theta, the sole width, sw, and camber. All of these factors contribute to the way a wedge or iron will interact with the ground through the golf swing. It is important to take these factors into consideration when determining which wedge or iron is best for a selected player or player of a selected type. A wedge or iron with too much bounce on it is more apt to actually bounce off of the ground at impact resulting in a thin shot. A golfer will have to be very precise when using a wedge or iron with not enough bounce on it because it will dig very easily. Hitting slightly behind the ball with a low bounce wedge or iron will cause the golfer to hit a fat shot. One thing to consider is that if the contact point on the sole of the wedge or iron is towards the leading edge, it is an indication that more bounce is needed. If the contact point is closer to the trailing edge of the sole then a golfer will need lower bounce. Having a contact point in the center of the sole from leading edge to trailing edge is an indication that the golfer has the correct amount of bounce on their wedge or iron.

Figure 7:
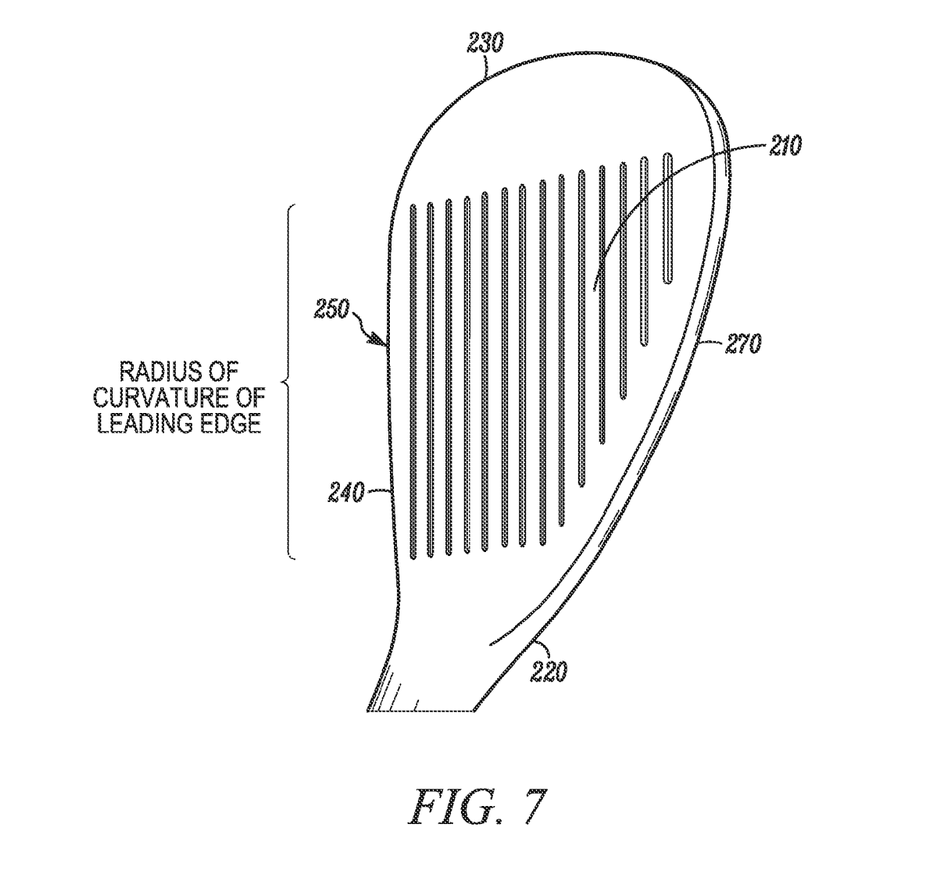
FIG. 7 is a top view of a head of a golf club, according to an example embodiment.

FIG. 7 is a top view of a head of a golf club, according to an example embodiment. In this top view the plane of the club face or ball contacting surface is visible. Also visible is the top line 270 and the leading edge 250 of the club head 200. Radius is the arc of the leading edge 250 when looking down at the wedge or iron, such as when the ball is addressed. Radius allows the leading edge 250 to maintain a position adequately behind the ball when the club face 210 is opened helping in greenside flop shots. A squared leading edge 250 is more effective in full shots or pitches when using a square club face 210 at impact. The radius may be subtle. For the sake of illustration, an arcuate path 700 is shown in FIG. 7. The arcuate path 700 over emphasizes the actual radius but places it on the leading edge 250 of the club. Because of radius, the axes of the various grooves do not necessarily intersect the leading edge 250. A line tangent to the bottom of the arc that is in the plane of the club face or ball contacting surface is used to measure the angles alpha that the axes make with respect to the plane of the club face.

The toe portion 230 is distal from the hosel socket 204 and hosel 206 where the shaft 110 is attached to the club head 200. As mentioned previously, the sole portion 240 intersects the ball contacting surface or club face 210 at the leading edge 250. The sole portion 240 has a plurality of substantially triangularly shaped grooves 260, 262, and 264 therein. The grooves, furrows or channels 260, 262, 264 are shown in FIG. 3 as hidden lines since the grooves do not terminate at the club face 210. In other words, the grooves or channels 260, 262, 264 do not produce any opening in the club face 210. The grooves, furrows or channels 260, 262, 264 each have an associated axis. As shown in FIG. 3, an axis 261 is associated with groove, furrow or channel 260, an axis 263 is associated with groove, furrow or channel 262, and an axis 265 is associated with groove or channel 264. The grooves, furrows or channels 260, 262, and 264 slant with respect to the sole 240 of the main body 202. The axis 261 of groove, furrow or channel 260 is shown as a hidden line in FIG. 2. The axis 261 corresponds to a line defining a bottom of the groove, furrow or channel 260. Since all the channels, furrows or grooves are substantially triangularly shaped, a first side wall of the groove intersects a second side wall of the groove at the bottom or axis of the groove. It should be noted that the bottom of the grooves, furrows or channels 260, 262 and 264 may be rounded in some example embodiments. A rounded edge or inside round at the bottom of the grooves or channels 260, 262, 264, may be more aesthetically pleasing and will also prevent a stress concentration area in the club head 200 and allow for more efficient turf interaction with the club head 200 and the ground.

Figure 4:
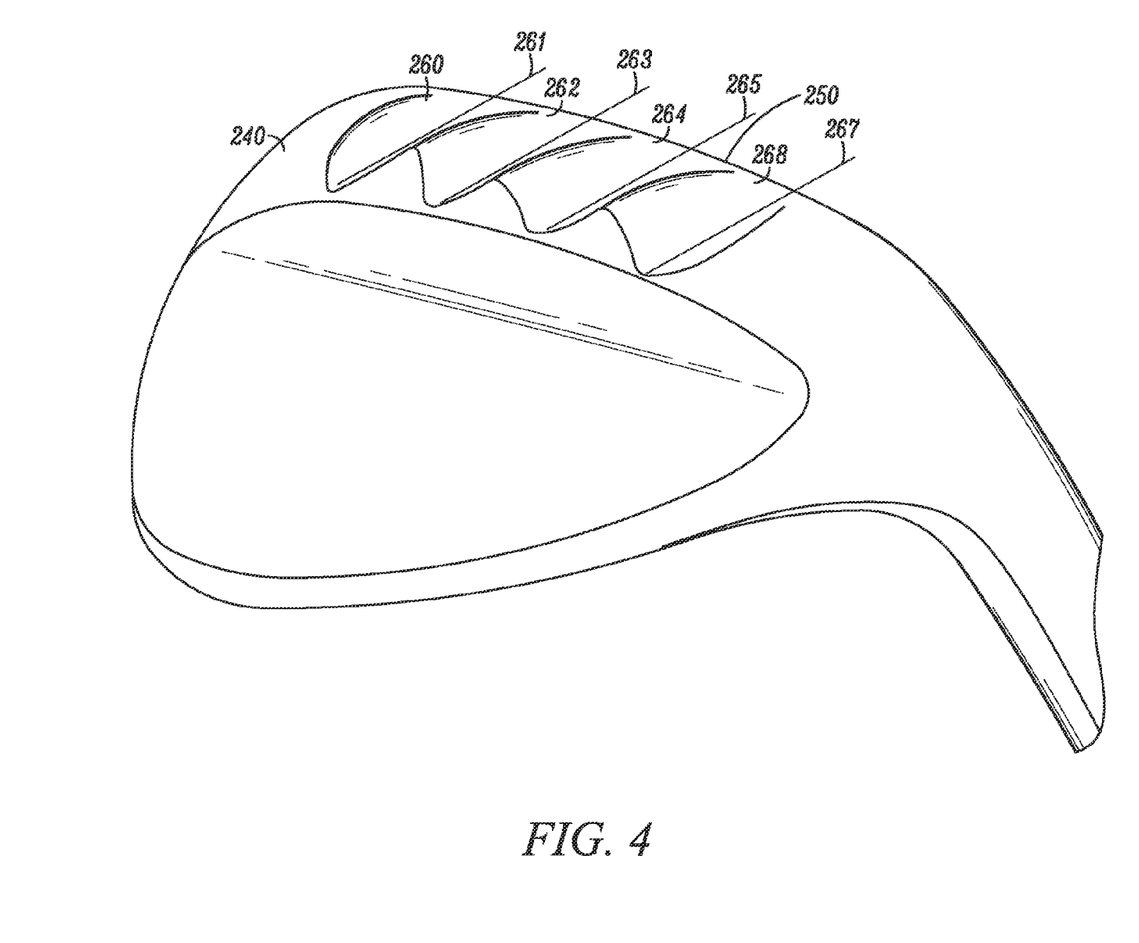
FIG. 4 is a bottom view of a head of a golf club, according to an example embodiment.

FIG. 4 is a bottom perspective view of a head 200 of a golf club, according to another example embodiment. The sole portion 240 includes a plurality of grooves, furrows or channels 260, 262, 264, 266. The number of grooves, furrows or channels can vary, the distance between the grooves, furrows or channels can vary, and the depth of the grooves, furrows or channels can vary. In some embodiments, grooves, furrows or channels of different depths may be used on the sole of a golf club. In still other embodiments, the grooves, furrows and channels may be unequally spaced. Each of the channels, furrows or grooves 260, 262, 264, 266 includes a groove, furrow or channel bottom that also is designated at an axis 261 263, 265, 267. The axes 261 263, 265, 267 are substantially parallel to one another. The axes 261 263, 265, 267 also are part of a line that traverses a plane 500 (shown in FIG. 5) including the club face 210. The point of intersection will be slightly below the leading edge 250 of the club head 200.

Figure 5:
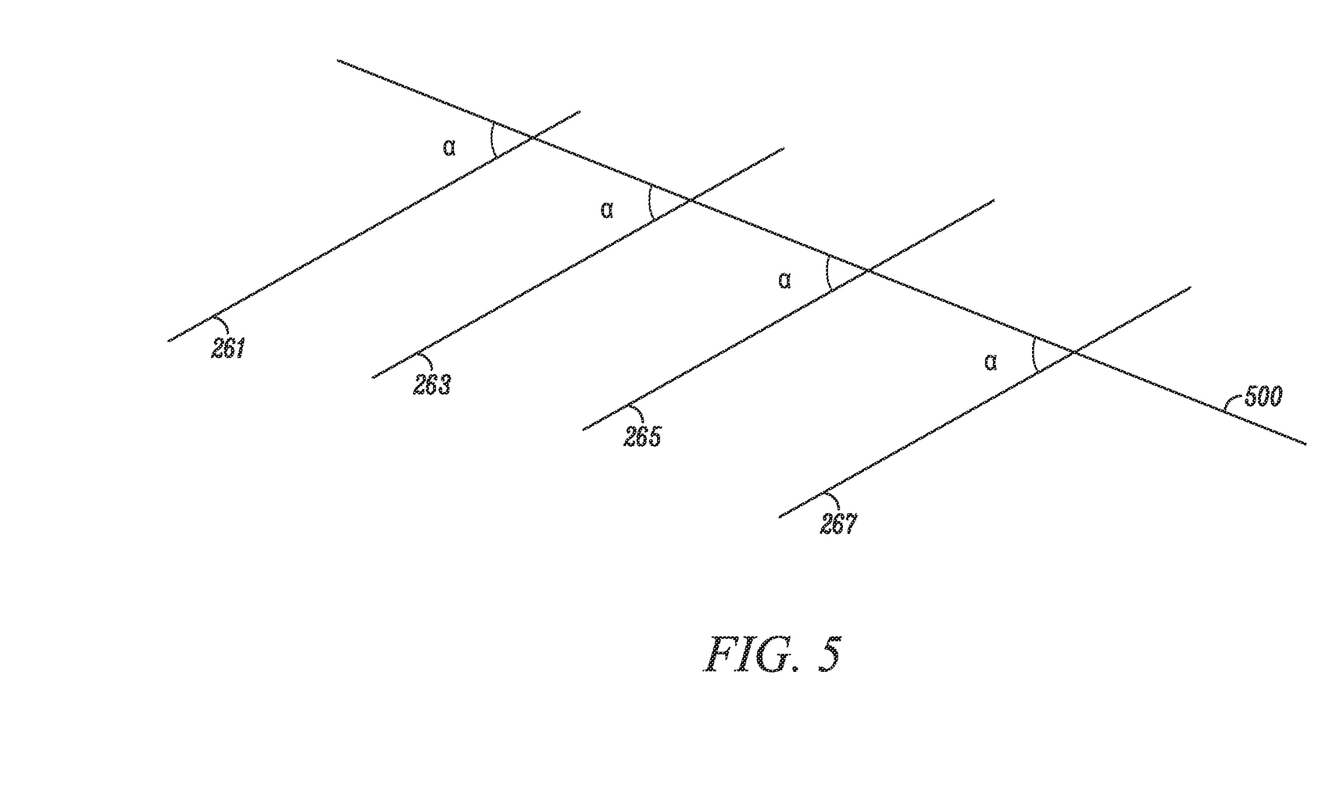
FIG. 5 is a schematic diagram of the axes of the grooves and the plane of the club face, according to an example embodiment.

FIG. 5 is a schematic diagram that shows the axes 261 263, 265, 267 intersecting the plane 500 that includes the club face 210. The plane 500 is depicted as a line. The axes 261 263, 265, 267 are substantially parallel to one another. It should be noted that each of the axes 261 263, 265, 267 makes an angle, alpha, with respect to the plane 500. Since the axes 261 263, 265, 267 are substantially parallel to one another, the angle alpha is substantially the same for each of the axes 261 263, 265, 267. It should be noted that the angle alpha is not perpendicular to the plane 500 that includes the club face 210. The leading edge 250 is also on the plane 500: The leading edge 250 can have a level of radius built into it. This is a level of curvature formed on the leading edge 250. As a result, the alpha angles will be described in relation to the face, and more specifically a plane 500 that includes the face because the angle between the face and the grooves or furrows will remain substantially constant. Therefore, the angle alpha represents the angle that the grooves or channels 260, 262, 264, 266 make with respect to the club face 210.

Now looking at FIGS. 2-5, there are a plurality of grooves having a substantially triangular shape or v-shape in the sole 240 of the club head 200. The number of grooves or channels can vary, the distance between the grooves can vary, and the depth of the grooves can vary. Each triangularly shaped or v-shaped groove or channel has an axis which corresponds to the bottom of the groove or channel. The axes are substantially parallel to each other and form a non-perpendicular angle with respect to the plane 500 of the club face 210. The plurality of substantially triangularly shaped or v-shaped grooves, furrows or channels extend across the sole but do not intersect the ball contacting surface or club face 210. Put another way, the head 200 of golf club 100 includes a plane 500 having the ball contacting surface or club face 210 within the plane. The axes of the plurality of triangularly shaped or v-shaped grooves traverse the plane but do not intersect the ball contacting surface or club face 250.

The angle alpha generally differs for each player for a particular club and their particular swing path in relation to the target. Therefore, a club may be customized by forming the plurality of grooves at the angle alpha determined by the player's swing. It should be noted that the angle alpha will change with respect to club length, the fullness of the swing which is normally used by the golfer, and the golfer's swing path. Thus, a golfer might have an angle of 67 degrees for a wedge, which is a relatively short club than the other clubs in a golfer's bag. A golfer might have an angle alpha of 84 degrees for an iron, such as a three iron which is longer than the wedge. Thus, the optimum angle alpha will vary with each club and how it is used. This angle is also combined with varying levels of bounce, camber, radius and sole width to ultimately create a wedge or iron that is ideal for a wide range of golfers.

In the discussion above, the angle alpha is varied based on the golfer. This lends itself to producing custom clubs for each golfer. Even though each might be different, there is generally an angle alpha which works well for most of the population of golfers for each club. For example, a wedge or iron having an angle alpha in the range of 58 degrees to 70 degrees works well for most golfers. A wedge or iron having an alpha angle of 64 will work well for most golfers. Listed below are general ranges for several clubs.

| Club | Range of alpha angles | Alpha angle for most |
|---|---|---|
| Lob Wedge 60 Degrees | 58-70 | 64 |
| 6 Iron 32 Degrees | 65-81 | 73 |

As can be seen in the table above, the ranges shift with the club length, the fullness of swing normally used by most golfers, and the individual golfer's swing path in relation to the target. Thus, a set of clubs with this feature can be manufactured for most golfers so that every golfer need not require customization for each club in a set of clubs. Thus, a set of clubs having this feature can be manufactured for the masses or can be custom fit for a particular golfer. It should be noted that even though a few clubs are shown as examples, other clubs can be formed with grooves, furrows or channels. In most instances the irons (1-9 iron clubs), wedges (Pitching Wedge, Gap Wedge, Sand Wedge, and Lob Wedge), hybrids, fairway woods also known as fairway metals, and the driver may be provided with the grooves, furrows or channels in the sole of the club. In most instances, the fairway woods and hybrids which are used on the fairway, such as a 3 wood and 5 wood club are provided with grooves, furrows or channels as discussed above. The driver or 1 wood may also be provided with grooves, furrows or channels. It should also be noted that the angles shown as ranges above are not restrictive. Wider ranges can be employed to cover a wide range of golfers that have a wide range of swings. The above table covers most golfers. Some have swing angles that are at the tail of the bell curve. These are the people that, more likely, need custom clubs.

FIGS. 1-5 show a right handed club. A left handed club will be a mirror image of those shown in FIGS. 1-5. The left handed club will still have grooves, furrows or channels in the sole that form an angle, alpha, which is non-perpendicular with respect to a plane that includes the face or ball contacting surface of the club. In operation, the grooves, furrows or channels 260, 262, 264 and 266 allow material to pass through the channels or grooves. This eases the golfer's swing. In addition, the portions between the grooves or channels 269, 262, 264, 266 act as rudders to keep the golfer's swing "straight" in relation to the target. The idea is that this may enhance performance since it will tend to keep the golfer's swing aligned with an efficient stroke on the ball.

Figure 8:
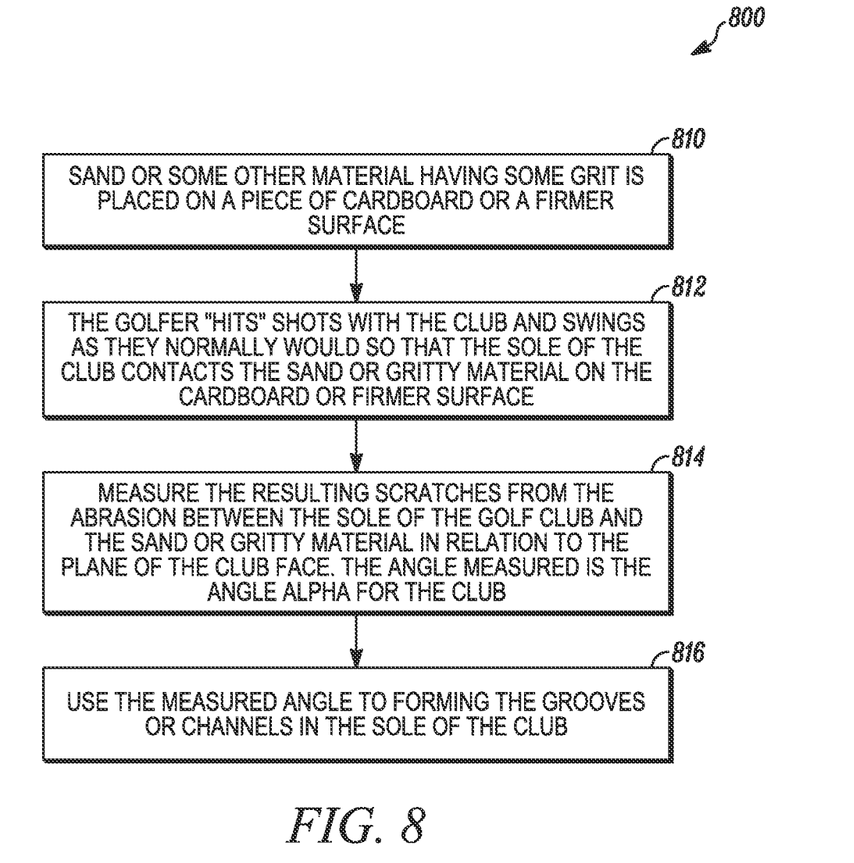
FIG. 8 is a flow diagram of a method associated with the computer system, according to an example embodiment.

FIG. 8 is a flow diagram of a method 800 for finding the angle alpha for a particular club. A normal soled club is used to determine the angle alpha. The angle alpha may also be termed as a swing path angle. The swing path angle substantially corresponds to the angle of the grooves with respect to the plane 500. To obtain the swing path angle or angle alpha for any club, a normal soled club is used. For the sake of example, the swing path angle or angle alpha will be determined for a wedge or iron will be discussed. It should be noted that the procedure will be the same for any club. Generally clubs that generally have the sole contacting a surface when used will benefit from these grooves.

Returning to the method 800, a wedge or iron without my grooves or rudders built into the sole is used. Sand or some other material having some grit is placed on a piece of cardboard or a firmer surface 810. The golfer "hits" shots with the club and swings as they normally would 812. The sole of the club contacts the sand or gritty material on the cardboard or firmer surface. Scratches result from the abrasion between the sole of the golf club and the sand or gritty material. These uniform scratches can be measured 814 in relation to the clubface and specifically in relation to the plane of the club face. The angle measured is the angle alpha for the club. This angle is then used in forming the grooves or channels in the sole of the club 816. In a custom club, the club is ground or machined to form the grooves, and the angle of the grooves or channels 260, 262, 264, 266 will substantially match the angle of the scratches that resulted in the custom fitting. In some embodiments of the method 800, an additional material is placed on the sole of the club to make the scratches produced more visible. For example, electrical tape or other material can be placed on the sole and can be used to identify the angle of the grooves for the particular golfer. The golfer can then hit shots impacting the normal playing surface. As a result, scratches from the abrasion between the ground and the electrical tape will reveal the golfer's swing path in relation towards the target. In one embodiment, a marker can be used on the sole of the club. In another embodiment, a tape can be applied to the sole of the club. In each instance the scratches reveal the swing angle of angle alpha for the club. In some embodiments of the method 800, golf swing fitting and analyzing equipment using radar, lasers, and cameras can be used to determine the angle of the swing path of the golfer. This data can be used to determine the orientation of the grooves on the sole of the golf club to fit the golfer. Some examples of companies that produce this technology are Trackman located in Vedbæk, Denmark, Flightscope located in Stellenbosch, South Africa, and Accusport located in Winston-Salem, N.C. USA.

When producing a set of clubs for the masses, a population of the angles resulting from a number of golfers is taken. The population will generally produce data that can be analyzed statistically to determine an angle alpha for a club that will be useful or will fit most golfers. The model for mass production may be created through a forging, casting, or machining manufacturing method. The product line will include varying levels of bounce, camber, radius, and sole width along with the average angle of the population for a specific lofted and length wedge or iron. This will create a product line of different options in regards to loft, length, and sole designs incorporating the sole grooves, furrows, or rudders for golfers to choose from when purchasing the mass produced model.

Figure 9:
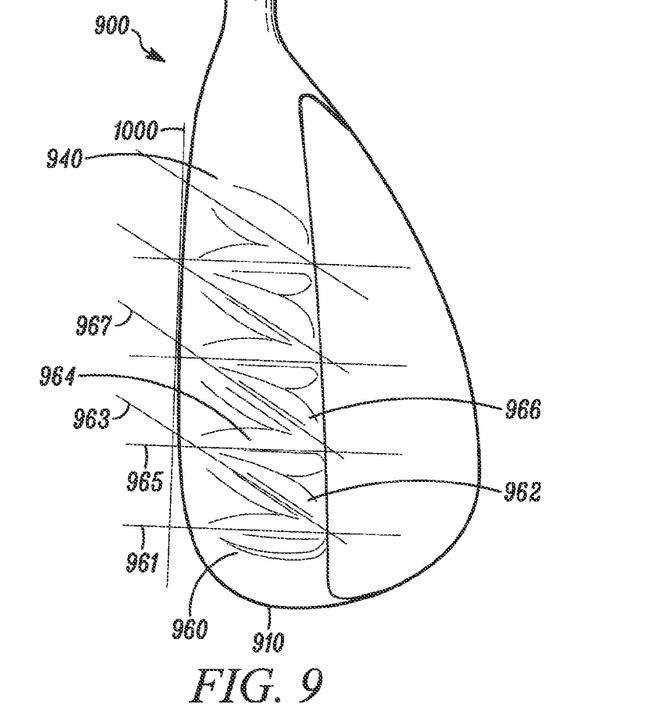
FIG. 9 is a bottom view of a golf club, according to another example embodiment.
Figure 10:
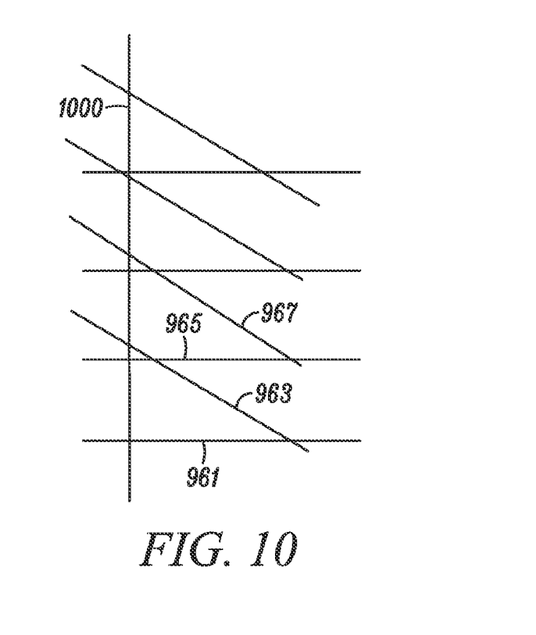
FIG. 10 is a schematic view of a golf club shown in FIG. 9, according to another example embodiment.

FIG. 9 is a bottom view of a golf club 900 according to another embodiment of the invention. FIG. 10 is a schematic bottom view of a golf club 900 according to another embodiment of the invention. Now referring to both FIGS. 9 and 10, the bottom view shows the sole of the golf club 900. As can be seen the grooves, rudders or furrows 960, 962, 964, 966 having axes 961, 963, 965, 967 are not necessarily substantially parallel to one another. Now referring to both FIGS. 9 and 10, the grooves, rudders or furrows occur at different angles with reference to the plane 910 that includes the ball contacting surface. Line 1000 shown in both FIGS. 9 and 10 is in the plane 910 of the ball contacting surface 910. The grooves, rudders or furrows still do not intersect the ball contacting surface of the club. On the sole 940 of the club 900, the axes 961, 963, 965, 967 of the grooves, rudders, channels or furrows can range from 0 degrees to 180 degrees from the ball contacting surface of the club. The axes 961, 963, 965, 967 of the grooves, rudders, channels or furrows can range from 0 degrees to 180 degrees with respect to one another. Having the grooves, rudders, or furrows not substantially parallel to one another within the same club head allows the ability to hit greenside flop shots and greenside bunker shots when the club face and golf stance is opened utilizing a more angled groove in relation to the club face. This design also allows for the utilization of a groove that is angled in a different fashion for full swing golf shots. A multitude of non-parallel grooves allow golfers to hit a variety of golf shots while utilizing certain grooves for certain golf shots.

It should be noted that even though the examples shown in the FIGs. above discuss grooves or furrows that are non-perpendicular with the face of the club, in some embodiments one or more of the furrows can be perpendicular or substantially perpendicular with respect to the face of the club. In fact the angles can include most any angle including an angle between 0 degrees and 180 degrees. This arrangement is considered to be within the scope of certain embodiments of the invention.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed:

1. A golf club apparatus comprising:
   a shaft; and
   a head attached to the shaft, the head further comprising a main body including:
      a ball contacting surface;
      a heel portion, the shaft attached to the main body proximate the heel portion;
      a toe portion distal from an attachment point of the shaft;
      a sole portion forming the bottom of the main body and positioned between the toe portion and the heel portion, the sole portion intersecting the ball contacting surface at a leading edge, the sole portion having a plurality of substantially triangularly shaped grooves therein with axes, each of the axes being non-perpendicular to the plane of the ball contacting surface,
   wherein the angle of the axes with respect to the ball contacting surface changes with the length of the club and a swing path of the golf club.

2. The golf club apparatus of claim 1 wherein the axes of the plurality of substantially triangularly shaped grooves are substantially parallel to one another.

3. The golf club apparatus of claim 1 wherein the plurality of substantially triangularly shaped grooves extend across the sole but do not intersect the ball contacting surface.

4. The golf club apparatus of claim 1 wherein the ball contacting surface is included in a plane and the axes of the plurality of triangularly shaped grooves traverse the plane but do not intersect the ball contacting surface.

5. The golf club apparatus of claim 1 wherein the angle of the axes with respect to the ball contacting surface or club face can be changed to correspond to a selected golfer's swing.

6. A club head for a golfing apparatus including a main body comprising:
   a club face for contacting the ball;
   a heel portion;
   a hosel positioned proximate the heel portion;
   a toe portion distal from heel portion;
   a sole portion forming the bottom of the main body and positioned between the toe portion and the heel portion and the leading edge to the trailing edge, the sole portion intersecting the club face at a leading edge, the sole portion having a plurality of substantially triangularly shaped grooves therein with axes, each of the axes being non-perpendicular to the plane of the club face,
   wherein the angle of the axes with respect to the ball contacting surface changes with the length of the club.

7. The club head of claim 6 wherein the axes of the plurality of substantially triangularly shaped grooves are substantially parallel to one another.

8. The club head of claim 6 wherein the axes of the plurality of substantially triangularly shaped grooves are substantially non-parallel to one another.

9. The club head of claim 6 wherein the plurality of substantially triangularly shaped grooves extend across the sole but do not intersect the club face.

10. The club head of claim 6 wherein the club face is included in a plane and the axes of the plurality of triangularly shaped grooves traverse the plane but do not intersect the club face.

11. The club head of claim 6 wherein the angle of the axes with respect to the club face is related to a selected swing path in relation to the target.

\* \* \* \* \*